Patented Apr. 7, 1936

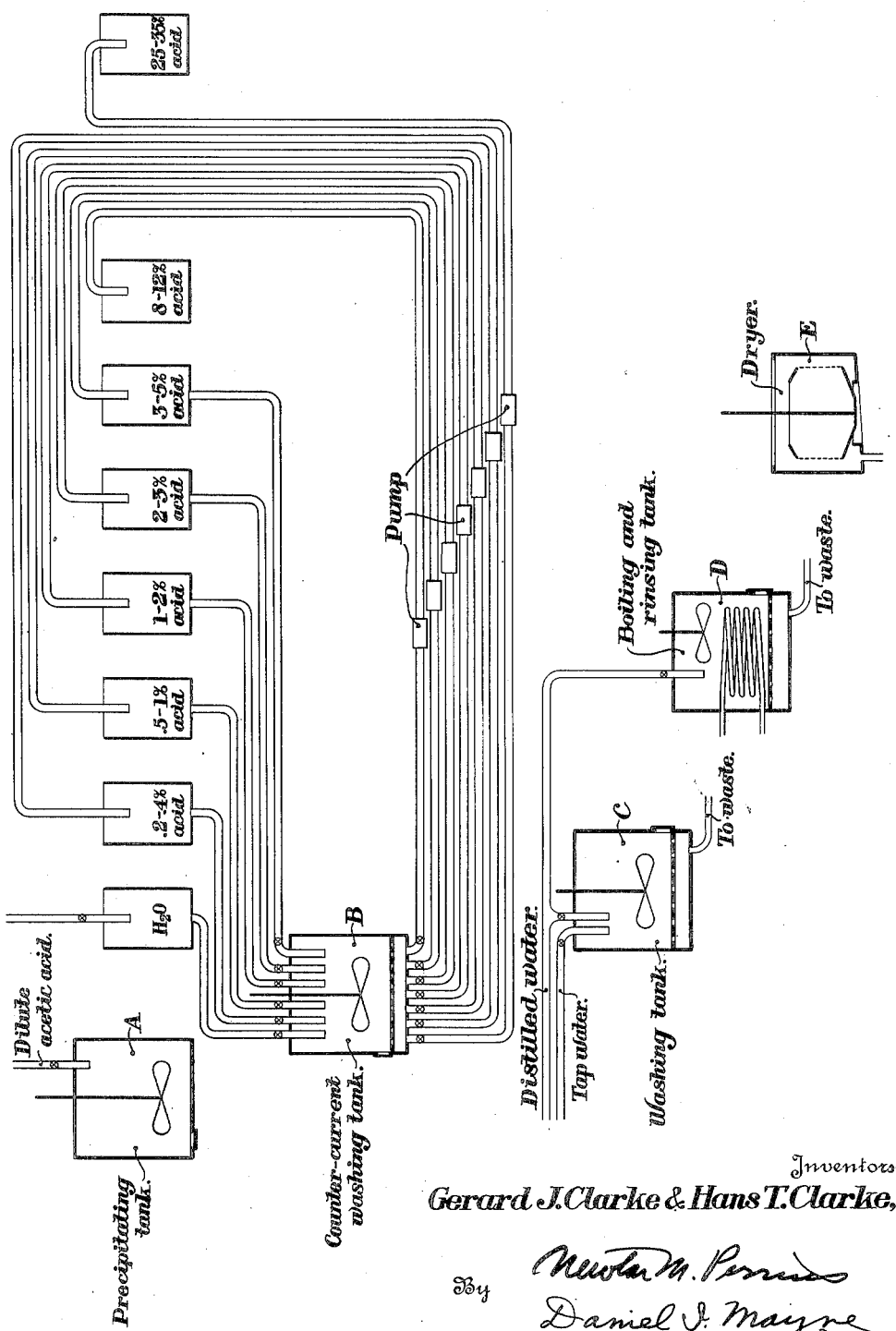

2,036,397

UNITED STATES PATENT OFFICE 2,036,397

PROCESS OF REFINING CELLULOSE ACETATE

Gerard J. Clarke, Rochester, and Hans T. Clarke, New York, N. Y., assignors to Eastman Kodak Company, Rochester, N. Y., a corporation of New York Application May 26, 1931, Serial No. 540,108

9 Claims. (Cl. 260—102)

This invention relates to the stabilization of organic cellulose esters, particularly cellulose acetate, in precipitated or fibrous form by (1) thoroughly washing to substantially remove mineral acid, and then (2) boiling in water without an alkaline reaction and in the absence of mineral acid.

It is well known that cellulose acetate has been subject to decomposition and instability as recognized for instance in Worden's, Technology of Cellulose Esters (1916) Volume VIII pages 2919-20 in which tests are given to determine the stability of various cellulose acetates. It is disclosed therein that the "stability factor" of a carefully prepared cellulose acetate should not exceed 5. This "stability factor" is defined as being the amount of acetic acid in grams liberated from 100 grams of material when heated at about 125° C. for three hours. A current difficulty in cellulose acetate manufacture has been the production of a cellulose acetate which will have sufficient stability for use in the finer arts, as in the production of photographic film.

One object of the present invention is to stabilize ordinary precipitated cellulose acetate so that the amount of decomposition of that material in the test referred to above (or any other, for that matter) is negligible.

Another object of our invention is to provide a process in which mineral acids are eliminated from the cellulose acetate whether they are in combined or uncombined form. It is highly important that mineral acids (present as catalysts, for instance, in the acetylation bath) such as sulfuric be removed as it is believed that the decomposition of cellulose acetates produced by the usual processes is due to incomplete elimination of those impurities. The prior art (for instance German Patent 196,730) has recognized also that the presence of combined sulfuric acid in cellulose acetates in the form of compounds such as cellulose sulfo-acetates have resulted in instability and decomposition so that in time these acetates lose their tenacity and become quite useless for many purposes. By our process we remove these objectionable mineral acids so that a pure and permanently stable material is produced.

Another object of our invention is the accomplishing of our process of purification and stabilization of organic cellulose esters without any marked loss of acetic acid or without presenting any problems of concentration of acetic acid from an extremely dilute solution. Cellulose acetate is ordinarily produced by reacting upon cellulose with a reaction mixture comprising glacial acetic acid, acetic acid anhydride and a catalyst such as sulfuric acid. The cellulose acetate thus produced may then be hydrolyzed in solution and in any event must be precipitated. This is usually done in water or aqueous acetic acid so that there results aqueous acetic acid of a strength below 50%—say from 25-35%. If this precipitate were merely washed with water there would result immense quantities of very weak aqueous acetic acid which it would be almost prohibitive, economically, to recover or utilize. By our process we recover an acetic acid having a concentration of about 25-35%, which concentration is useful for many purposes connected with cellulose acetate manufacture and also other processes. If a more concentrated acetic acid is desired it (because of its already fairly high concentration) can easily be obtained by azeotropic distillation with ethylene chloride such as is disclosed in Clarke and Othmer application Ser. No. 232,916, filed November 11, 1927.

Another object of our invention is to provide a process to uniformly wash the entire mass of cellulose acetate, in the interior of the same as well as on the exterior. Other previously known washing processes have provided for the washing of the cellulose acetate while this material was in a compacted form so that the interior retains a higher acid content than the exterior. In our process, on the other hand, the cellulose acetate is treated in the loosely agglomerated form in which it is precipitated from its reaction mass. This serves to prevent any localized reactions which would probably occur in the interior of the mass due to mineral acid being present therein.

We have found that cellulose acetate when properly washed and purified after its precipitation, when subjected to stability tests such as disclosed in Worden referred to above shows no decomposition and formation of acetic acid so that the stability factor is an infinitesimal amount. We have found that by washing the precipitated cellulose acetate until free of mineral acid, boiling in water free from alkali or mineral acid and subsequently rinsing, a stabilized cellulose acetate which will retain its characteristics of tenacity etc. permanently is obtained.

In our process at certain critical points we have discovered that even slight alkalinity should be avoided. For example it was found that if the boiling step is carried out with ordinary tap water which contains only a small amount of bicarbonates and other impurities which produce an alkalinity in the water, the solubility of the cellulose acetate and its utility in the finer plastic arts is decreased. For instance, if a cellulose acetate which has been hydrolyzed to acetone-solubility is so treated, this solubility in acetone is decreased to an appreciable extent. Also, if the boiling step is carried out without the necessary thoroughness to remove mineral acids from the interior as well as the exterior of the mass, the heat of the boiling operation will be conducive to undesirable localized reactions in the mass. To avoid any undesirable action in the boiling bath, we have found it essential to employ water which is not alkaline and which does not contain mineral acids. The use of purified water is also preferred in the rinsing immediately preceding the boiling step and in the rinsing step after the cellulose acetate has been boiled and drained.

Obviously as distilled water is the purest form of water obtainable, the process is carried out with distilled water in the boiling bath and preferably in the rinsing bath. In some cases, however, distilled water may not be obtainable so that some substitute must be employed at the critical points of the process. We have found that water which contains such alkaline compounds as bicarbonates, may be treated with an organic acid, such as acetic acid, to neutralize the alkalinity of the water. The term "purified water" will be hereinafter employed to refer to water which is not alkaline and which does not contain mineral acids, such as distilled water, or a water such as common tap water which has been treated with an organic acid to neutralize its alkalinity.

The cellulose acetate to which this process is usually applied is that which has been precipitated from its reaction mass preferably by the method disclosed in the U. S. application Serial No. 245,059 of H. T. Clarke, filed January 6, 1928, in which the precipitation is effected by dilute aqueous acetic acid. This type of precipitation not only gives a better product but also is particularly well suited for our present process in which various concentrations of acetic acid are available for compounding the precipitating bath. In this manner the diluted aid is concentrated by mixing with the acid of the reaction mass so that a considerable saving results.

Obviously, the precipitate may be washed preliminary to the boiling by continuously running water through it or by successive washings with water; however, washing in this manner would result in extreme dilution of the acetic acid which is removed from the precipitate and even a loss of some of the acid when dilutions are obtained which contain so little acetic acid that recovery is not economical. The method of washing which we prefer is characterized by three parts; namely, (1) counter-current washing of the precipitate with diminishing dilutions of an organic acid, such as acetic acid (2) successive rinsings in tap water to remove most traces of acid and (3) a rinse with purified water (preferably distilled) to remove any tap water or other impurities which the tap water did not remove. This washing has the advantage of concentrating the acetic acid to about 30% strength and allows a high purification of the cellulose acetate, with a very little waste of acid due to the fact that acid is present only in negligible amounts in the mass after the counter-current washing has taken place.

In cases where the counter-current washing is sufficient the washings with tap water preliminary to the boiling are, of course, not necessary although if time is not considered, the parts designated (2) and (3) are desirable in the washing of the acetate.

When we refer to counter-current washing herein, it will be understood that we refer to more than the mere passage of the washing fluid over the cellulose acetate in a direction opposite to the passage of the cellulose acetate through a given system as frequently done in the chemical industry in washing precipitates. The term as employed by us refers to the washing of a batch of cellulose ester precipitate, such as cellulose acetate, with successively weaker batches of an aqueous organic acid, such as acetic acid, accompanied by thorough agitation of the precipitate whereby the resulting filtrate has a strength higher than that of the aqueous acid added. Whereas in most counter-current systems the precipitate actually moves through the system and the wash moves oppositely thereto, we prefer to complete the acid washing operation of a given batch in a single agitating container while supplying batches of acid thereto from central storage tanks for each strength of acid which also supply other agitating containers. This entire system will be apparent from the more detailed description hereinafter given.

As pointed out previously, the mass after the washing is boiled in distilled water or in some other purified water where distilled water is not available. The boiling is carried out long enough to stabilize the cellulose acetate and we have found that 12 hours boiling is sufficient as a rule. The boiling may be carried out under pressure if desired providing high temperatures which might lead to degradation are avoided. However, we have found that the process is satisfactory when carried out at atmospheric pressure and in our preferred process ordinary atmospheric pressure is employed.

If desired, a plurality of boilings may be employed but the difference in stabilities between cellulose acetate boiled once and that subjected to several boilings is so insignificant that there is usually no necessity for a second boiling to obtain a stable cellulose acetate.

After the mass is boiled, the water is drained off and, if desired, the product may be rinsed with distilled water at ordinary temperature after which it is dried in any manner desired such as by centrifuging, subjecting to warm dry air, or passing over warm rollers.

The accompanying drawing depicts a diagrammatic set-up of a system in accordance with our invention.

The following example is given to illustrate one embodiment of the present invention: The reaction mixture from an acetylation bath is slowly poured with high speed stirring into an excess of an approximately 30% aqueous acetic acid in the precipitating tank A shown in the diagram and is kept at about that acid strength by adding more dilute acid of the proper strength and in the proper ratio. The dilute acid is preferably supplied from the tank containing acetic acid of 8–12% strength which is obtained from the first washing of the precipitate as described herein. When the precipitation is completed the entire mass is transferred manually or by gravity (preferably with the precipitate in suspension) to the washing tank, B, which is provided with a perforated false bottom to allow draining off of fluid leaving the precipitate behind. After the mass is placed in tank, B, the precipitating liquid which is an aqueous solution of acetic acid of about 25–35% is drained off and pumped to a tank to be held in reserve for other precipitations, any excess being drawn off and concentrated such, for instance, as by azeotropic distillation.

Obviously, the precipitated cellulose acetate contains many fine particles, especially in view of the precipitation with high speed stirring. Consequently, upon drawing off a liquid initially from the cellulose acetate mass, some of the particles will pass along through the false bottom with the dilute acid drained off. This may be remedied by recirculating the liquid, initially drawn off, back through the tank until a layer of cellulose acetate fibers has formed over the false bottom to assure the retention of all solid material when the liquid passes through it. The recirculating means is not shown in the diagram, but, obviously, may be a passage extending from the area below the false bottom into the top of the particular tank.

After draining off the precipitating liquid from the mass, the tank B is filled with aqueous acetic acid of about 3-5% concentration which has been obtained from a previous washing. The mass is thoroughly stirred for a couple of hours to cause complete diffusion of the stronger acid in the particles of the precipitate, with the weaker acid added, resulting in an acid which is now of about 8-12% concentration and which is drawn off from the precipitate and placed in a reservoir where it may be kept available for maintaining a constant concentration in the precipitating bath or for its own concentration by a further washing operation. Aqueous acetic acid of about 2-3% is then poured on the mass in tank, B, and the mixture is again thoroughly agitated for a couple of hours after which the acetic acid of now increased concentration is pumped to the tank containing acid of 3-5% concentration, for subsequent use in washing. These operations are repeated using successive batches of acid having concentrations of 1-2%, .5-1% and .2-.4%, respectively, and then water is employed in the last wash. The washing liquid after each wash is pumped to the tank containing the next higher concentration of acid than that from which it came. The mass of precipitate which we prefer to work with is 750 lbs. and when a mass of this size is used, we have found that about 1800 gallons of washing liquid is suitable.

After the counter-current washing of the mass if still further washing should be desired it may be transferred to washing tank, C, having a perforated false bottom, and may be washed with tap water by allowing the water to stand on the precipitate, preferably with stirring, for 2 hours and then draining off the water. This operation may be repeated a number of times, such as, for instance, 25 times, after which one washing may be conducted using distilled water. In all of these operations, the advantage of thorough stirring is not to be overlooked as it is important to break up any masses of precipitate or large particles thereof to give access to the washing liquids.

The mass is next transferred to the boiling tank D, which contains a false bottom and a heating coil through which superheated steam may be passed. The tank is then filled with distilled water and the water heated to boiling and maintained at this temperature for about 12 hours with thorough stirring after which the water is drained off and the mass rinsed with distilled water. It is, of course, to be understood that in many cases this final rinsing step could be dispensed with and a pure product would be obtained. However, to avoid any uncertainty, we prefer in practice to employ the rinsing step to guarantee the purity and stability of the final product. The cellulose acetate may now be dried by centrifuging in the centrifuge E followed by oven drying.

It is obviously apparent that in the carrying out of the counter-current wash, the cellulose acetate will retain approximately the same amount of liquid after each washing. Consequently, in each washing the washing liquid mixes with this retained liquid from the previous bath. By using about the same amount of precipitate in each batch and the same amount of liquid for each washing step, the concentration of the spent washing liquid in each step may be predetermined rather exactly so that the concentration of the spent liquid of each step will be known without the necessity of taking any measurements of the density of the dilute acid.

As pointed out previously, there may be circumstances where distilled water is not available for the boiling step of the process. Where only a water having an alkaline tendency is available, a supply of water for the boiling may be prepared by a simple treatment of the water. Obviously, if the water containing, for example, sodium bicarbonate, is used without modification, sodium carbonate will be formed upon boiling which, if allowed to remain, would cause hydrolysis on the outside of the cellulose acetate particles with a resulting lack of uniformity. We have found that where, for instance, an acetone-soluble cellulose acetate is boiled in a water of alkaline tendencies that the solubility in acetone is decreased according to the time consumed in boiling. For example, the acetate if boiled for 12 hours in an ordinary tap water which exhibits only a small alkalinity, shows, after the boiling, only a partial solubility. Other samples of the same acetate were boiled for 4, 6 and 8 hours and these samples after boiling showed an improved acetone-solubility over that which had been subjected to 12 hours boiling.

We prepare for the boiling step in the case of water having an alkaline content by first determining the amount of alkalinity (bicarbonates, etc.) present in the water. Then an amount of acetic acid is added which will exactly neutralize the amount of alkalinity present, after which the washed sample is immersed in the purified water and the water is boiled, preferably with thorough agitation, for about 12 hours. In contrast to the hydrolytic action of the sodium carbonate which is formed when the untreated water is used, the sodium acetate formed in the purified water exerts no hydrolytic action and even acts as a buffer toward any trace of mineral acid that might be present in the bath.

It might be supposed, that, as the unwashed originally precipitated cellulose acetate contains acetic acid, it would be equally as satisfactory to boil a partially washed precipitated cellulose acetate with the hard water itself, thus depending on the acetic acid already present to neutralize the hardness in the water. However, in that case, the mineral acids originally present may be present to an extent sufficient to cause appreciable damage by hydrolysis especially in the interior of the incompletely washed cellulose acetate.

From the foregoing, it will be observed that the process which we have invented comprises the complete washing of cellulose acetate and the boiling of the washed acetate in purified water. The washing part of the process is preferably carried out by (1) the counter-current washing of the precipitated cellulose acetate and the (2) intermittent washing of the cellulose acetate with water.

The counter-current washing part of the washing operation is performed upon cellulose acetate precipitated from a reaction mixture by means of dilute acetic acid, which dilute acid is preferably made up from the acid procured in the counter-current washing process. For example, the acid employed is preferably of about 8% concentration so as to produce a concentration of about 30% concentration in the precipitating tank. It is to be noted that one tank in the counter-current process contains dilute acid of about 8% strength and this acid may be used directly as the precipitating liquid. If desired, acid from the 25-35% tank may be mixed with acid from the tanks containing rather dilute acid or with water to make up a solution of about 8% strength for the precipitating liquid, or to supplement the acid from the 8-12% tank. The precipitation is carried out with rapid stirring to assure uniformity and completeness. The entire mass is then transferred into a washing tank provided with means for draining off liquids and the precipitating liquid of about 30% strength is drained off and conveyed to a tank in which only acid of that approximate concentration is kept. The mass is then washed successively with dilute acids of progressively weaker concentrations which were procured from a previous washing and were retained in tanks in each of which a certain definite concentration is kept. The mass is then washed with water in an amount equivalent to each of the respective acid washers. The water becomes thereby acidified and is then conveyed to the tank containing the acid of lowest concentration. It is preferred that the mass be stirred during each washing step to assure a more perfect mixing of the washing liquid and the liquid retained by the mass.

The second part of the washing step is carried out by transferring the cellulose acetate which has been subjected to counter-current washing to another washing tank wherein the mass is subjected to a series of washings with water, each washing being of about 2 hours' duration. It is preferred that the mass be agitated during each washing operation so as to thoroughly break up the acetate particles and allow penetration of the washing liquid.

The boiling is carried out in a separate tank in which the thoroughly washed cellulose acetate is immersed in purified water which is then heated to boiling and maintained at that temperature for several hours, preferably with agitation.

After this treatment the cellulose acetate is purified and stabilized, and upon rinsing, if desired, and drying, the material is ready to be employed for any of its customary uses such as sheeting, artificial silk, etc. The products made from this cellulose acetate exhibit permanency and resistance to decomposition.

It at once becomes apparent that our purifying and stabilizing process may be applied to other cellulose esters, such as cellulose propionate, acetate-propionate, acetate-stearate, acetate-nitrate, etc., especially those in which a mineral acid such as sulfuric has been employed in any part of the process of manufacture. It is to be understood that in the case of cellulose propionate or butyrate, for example, the acid which is concentrated by our process may be propionic or butyric acid respectively. In some acylation processes monochloracetic or an alkoxy acetic acid may be employed as the solvent and thereby replaces the acetic acid in whole or in part as the dilute acid in the counter-current washing of our process. Other applications of our process to various organic acid esters of cellulose are obvious to those skilled in the art.

What we claim as our invention is:

1. A process of refining an organic acid ester of cellulose which comprises subjecting a batch containing the ester to a series of dilute organic acid baths of progressively diminishing concentration, washing with water until substantially all the mineral acid which may be present is removed and then boiling the batch in purified water.

2. A process of refining an organic acid ester of cellulose which comprises subjecting a batch containing the ester to a series of dilute organic acid baths of progressively diminishing concentration, washing with water until substantially all the mineral acid which may be present is removed, and then boiling the batch in distilled water.

3. A process of refining an organic acid ester of cellulose which comprises subjecting the organic ester precipitated from a reaction mixture containing a mineral acid to a series of aqueous organic carboxylic acid baths of progressively diminishing concentrations approaching the limit 0, and then boiling the washed organic ester in purified water.

4. A process of refining an organic acid ester of cellulose which comprises subjecting the organic ester precipitated from a reaction mixture containing a mineral acid to a series of aqueous organic carboxylic acid baths of progressively diminishing concentrations approaching the limit 0, and then boiling the washed organic ester in distilled water.

5. A process of refining an organic acid ester of cellulose which comprises subjecting the organic ester precipitated from a reaction mixture containing a mineral acid to a series of aqueous acetic acid baths of progressively diminishing concentrations approaching the limit 0, and then boiling the washed organic ester in purified water.

6. A process of refining an organic acid ester of cellulose which comprises subjecting the organic ester precipitated from a reaction mixture containing a mineral acid to a series of aqueous acetic acid baths of progressively diminishing concentrations approaching the limit 0, and then boiling the washed organic ester in distilled water.

7. In the process of refining precipitated organic acid esters of cellulose the step of subjecting the precipitated ester in loosely divided form to a series of aqueous organic carboxylic acid baths of progressively diminishing concentrations approaching as the limit, 0.

8. In the process of refining precipitated organic acid esters of cellulose the step of subjecting the precipitated ester in loosely divided form to a series of aqueous acetic acid baths of progressively diminishing concentrations approaching as the limit, 0.

9. In the process of refining a cellulose acetate, the step of subjecting the acetate to a series of aqueous organic carboxylic acid baths of progressively diminishing concentrations approaching as the limit, 0.

GERARD J. CLARKE.
HANS T. CLARKE.